United States Patent [19]
Ward et al.

[11] 4,280,619
[45] Jul. 28, 1981

[54] MOVING BELT CONVEYOR MECHANISM

[75] Inventors: Christopher J. Ward, Barnby Dunn, Near Doncaster; Septimus Hughes, South Shields, both of England

[73] Assignee: Conveyor Improvements (Doncaster) Limited, Doncaster, England

[21] Appl. No.: 99,979

[22] Filed: Dec. 3, 1979

[30] Foreign Application Priority Data

Dec. 19, 1978 [GB] United Kingdom ............... 49139/78

[51] Int. Cl.³ ...................... B65G 15/08; B65G 15/60
[52] U.S. Cl. .................................... 198/823; 198/826
[58] Field of Search ............... 198/823, 826, 822, 841, 198/837

[56] References Cited
U.S. PATENT DOCUMENTS 1,255,659  2/1918  Stephens ............................. 198/826
3,443,678  5/1969  Reilley ................................ 198/823

Primary Examiner—Robert B. Reeves
Assistant Examiner—Douglas D. Watts
Attorney, Agent, or Firm—Browdy and Neimark

[57] ABSTRACT

Support mechanisms for an endless load-carrying belt for causing it to trough in the region of a loading point, the support mechanisms being constituted by a troughing mat extending completely across the conveyor, the opposite ends of the troughing mat being secured to bearers disposed on opposite sides of the conveyor and capable of being angularly adjusted to suit the degree of troughing required. Screws are provided for adjusting the positions of the bearers on angularly adjustable brackets by which they are carried so that a height adjustment of the troughing mat can accompany an angular adjustment of the bearers.

7 Claims, 6 Drawing Figures

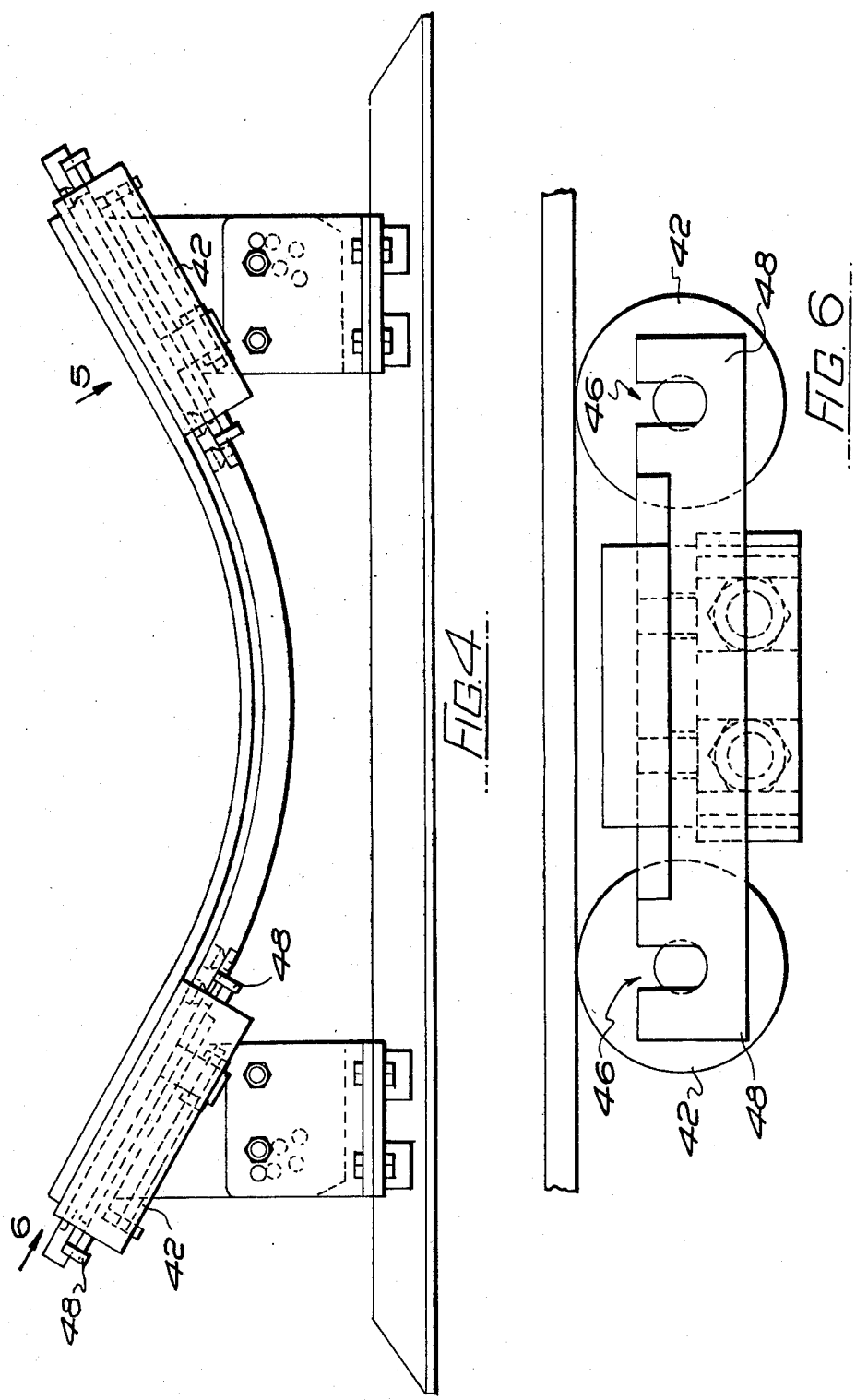

MOVING BELT CONVEYOR MECHANISM

BACKGROUND OF THE INVENTION

The invention relates to a moving belt conveyor mechanism such as are used in coal mines and quarries for example.

Moving belt conveyor mechanisms are used to convey loose material from place to place and comprise an endless load-carrying belt encircling respective driven and idler drums and usually supported at intervals by idler rollers. In the region of a loading point it is necessary that the load-carrying belt should be capable of being caused to trough. It is also very desirable that the degree of troughing should be adjustable and that the belt should be more fully supported at the loading point than at other points to safeguard the belt from damage due to impact loading.

SUMMARY OF THE INVENTION

Accordingly, it is an object of the invention to provide support means for fitment to a moving belt conveyor mechanism, for supporting the load-carrying belt in the region of a loading point, by means of which a troughing adjustment can be made with great facility. It is a further object of the invention to provide such support means which will support the belt very fully in the region of a loading point. When heavily loaded and when subject to impact loading the belt is supported across its entire width.

BRIEF DESCRIPTION OF THE DRAWINGS

The above objects and advantages of the invention will become more apparent from a consideration of the detailed description with reference to the accompanying drawings, of which:

FIG. 3 is a view in the direction of arrow 3 in FIG. 1;

FIG. 4 is a view similar to FIG. 1 and illustrating a possible modification;

FIG. 6 is a view in the direction of arrow 6 in FIG. 4.

DETAILED DESCRIPTION OF THE PREFERRED EMBODIMENTS

Figure 1:
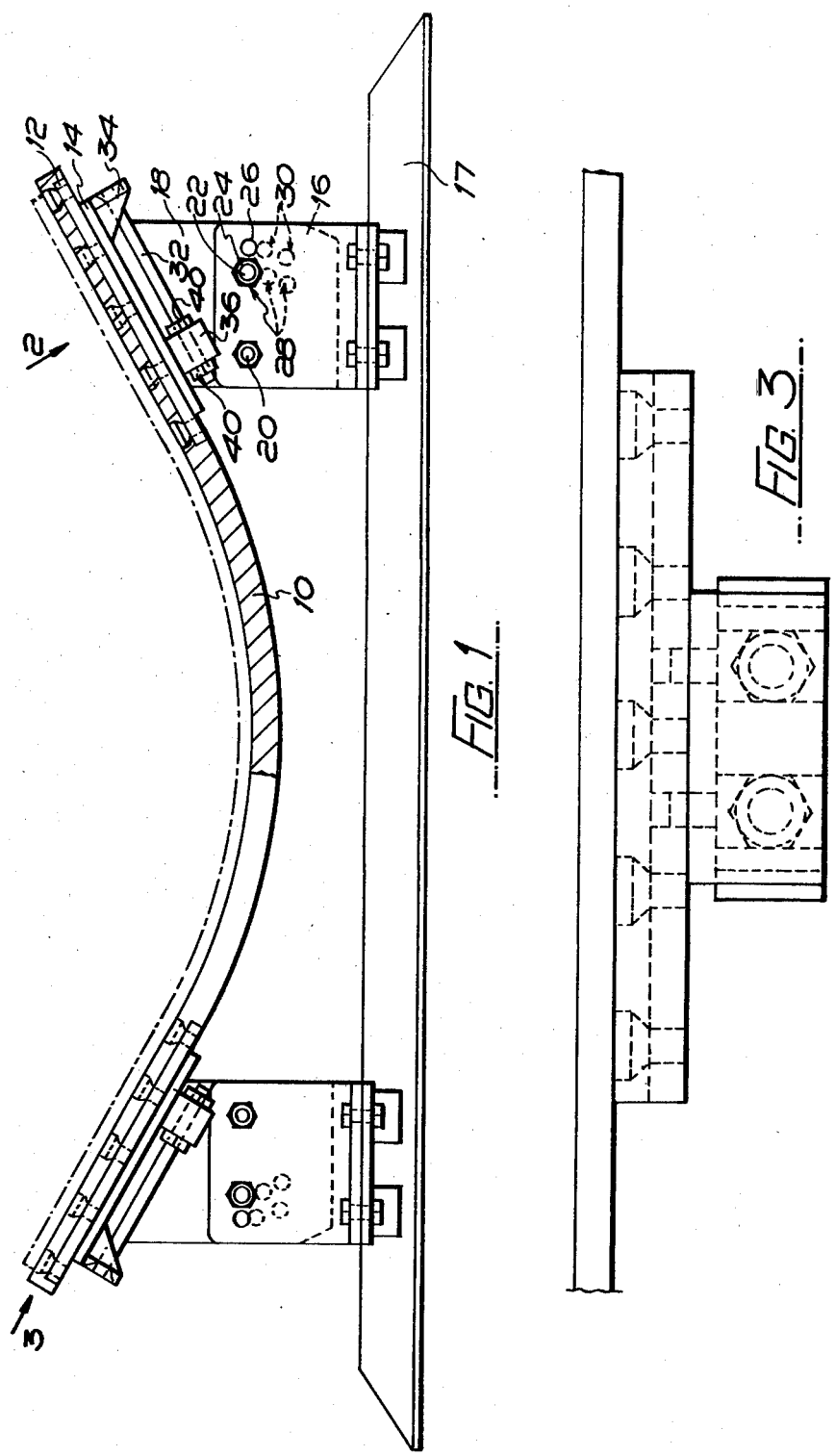
FIG. 1 is a front view of support means embodying the invention for fitment to a moving belt conveyor mechanism.
Figure 2:
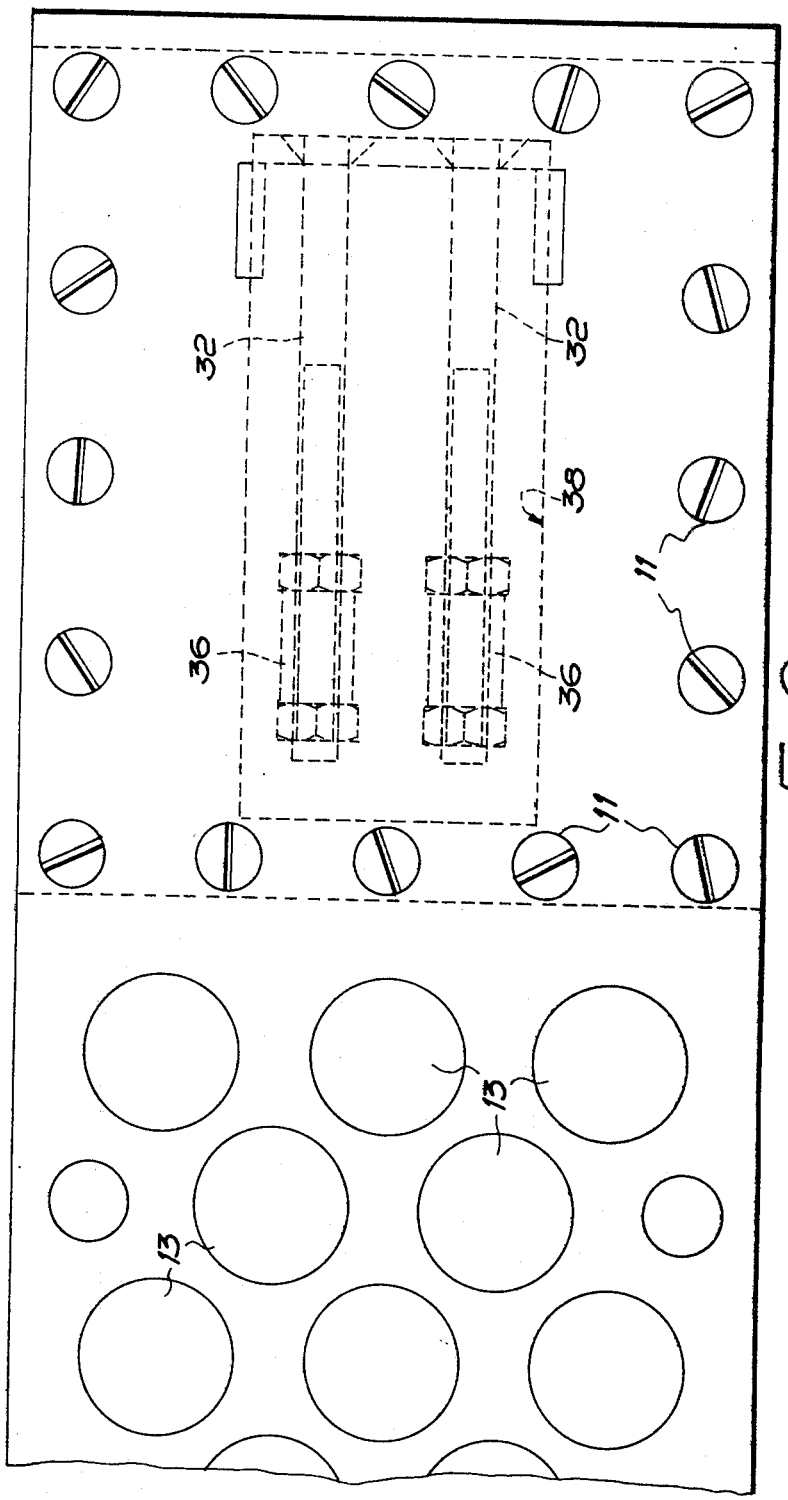
FIG. 2 is a scrap view in the direction of arrow 2 in FIG. 1.

Referring now to FIGS. 1 to 3 of the drawings, there is there illustrated support means for fitment to a moving belt conveyor mechanism in the region of a loading point thereof which will cause the load-carrying belt to trough in that region (a load-carrying belt being indicated in transverse section by the chain-dotted lines in FIG. 1).

The support means are constituted by a synthetic plastics troughing mat 10 secured at its opposite ends to metal bearers 12 which are mounted on respective angularly adjustable mounting brackets 14, the latter being mounted on a pair of spacer brackets 16 spaced apart transversely of the load-carrying belt on a base plate 17. The synthetic plastics troughing mat is secured at its opposite ends to the metal bearers by a plurality of countersunk head screws 11. A central portion of the troughing mat, shown suspended between the metal bearers, is provided with a plurality of holes 13 through which dirt can fall as the load-carrying belt slides on it.

The mounting brackets 14 are each connected to the spacer brackets 16 on which they are mounted by means of clamping plates 18 welded to said mounting brackets and secured to the respective spacer brackets by means of nut and bolt assemblies 20 which form pivotal connections and by means of nut and bolt assemblies 22 the bolts of which can be engaged with selected holes in the spacer brackets and in the clamping plates to bring about a required angular adjustment of the mounting brackets. As shown, each spacer bracket is provided with two holes 24 and 26 which can be used selectively and each clamping plate is provided with three holes 28 arranged to be brought selectively into alignment with the hole 24 in the associated bracket and with two holes 30 arranged to be brought selectively into alignment with the hole 26 in the associated bracket. It will be seen that by using the holes 26 in the spacer brackets and one or other of the two holes 30 in the clamping plates, this effectively halves the steps of angular adjustment which can be made by using the holes 24 in the spacer brackets and selected holes 28 in the clamping plates. Thus it will be seen that each of the oppositely disposed mounting brackets 14 carrying the metal bearers 12 are capable of being angularly adjusted according to the degree of troughing required.

Referring now in particular to FIGS. 2 and 3, the metal bearers are slidably mounted on the angularly adjustable mounting brackets for movement in a transverse direction relative to the load-carrying belt. Screw means, constituted by pairs of adjusting screws 32, are provided for adjusting the positions of the metal bearers on the mounting brackets. The adjusting screws are welded at their outer ends to depending lug portions 34 of the mounting brackets, and screwthreaded lengths of said screws extend through lugs 36 which are formed on the metal bearers 12 and which project downwards through apertures 38 in the mounting brackets. Pairs of nuts 40 which are carried on the screwthreaded lengths of the adjusting screws and which flank the lugs 36 can be adjusted to bring the metal bearers into the required positions. The arrangement is such that in this way a height adjustment of the troughing mat can be effected in addition to the adjustment referred to above for varying the angle of troughing. It may be necessary to effect a height adjustment of the troughing mat following an adjustment of the troughing angle, but of course either of these adjustments may be made independently of the other.

Figure 5:
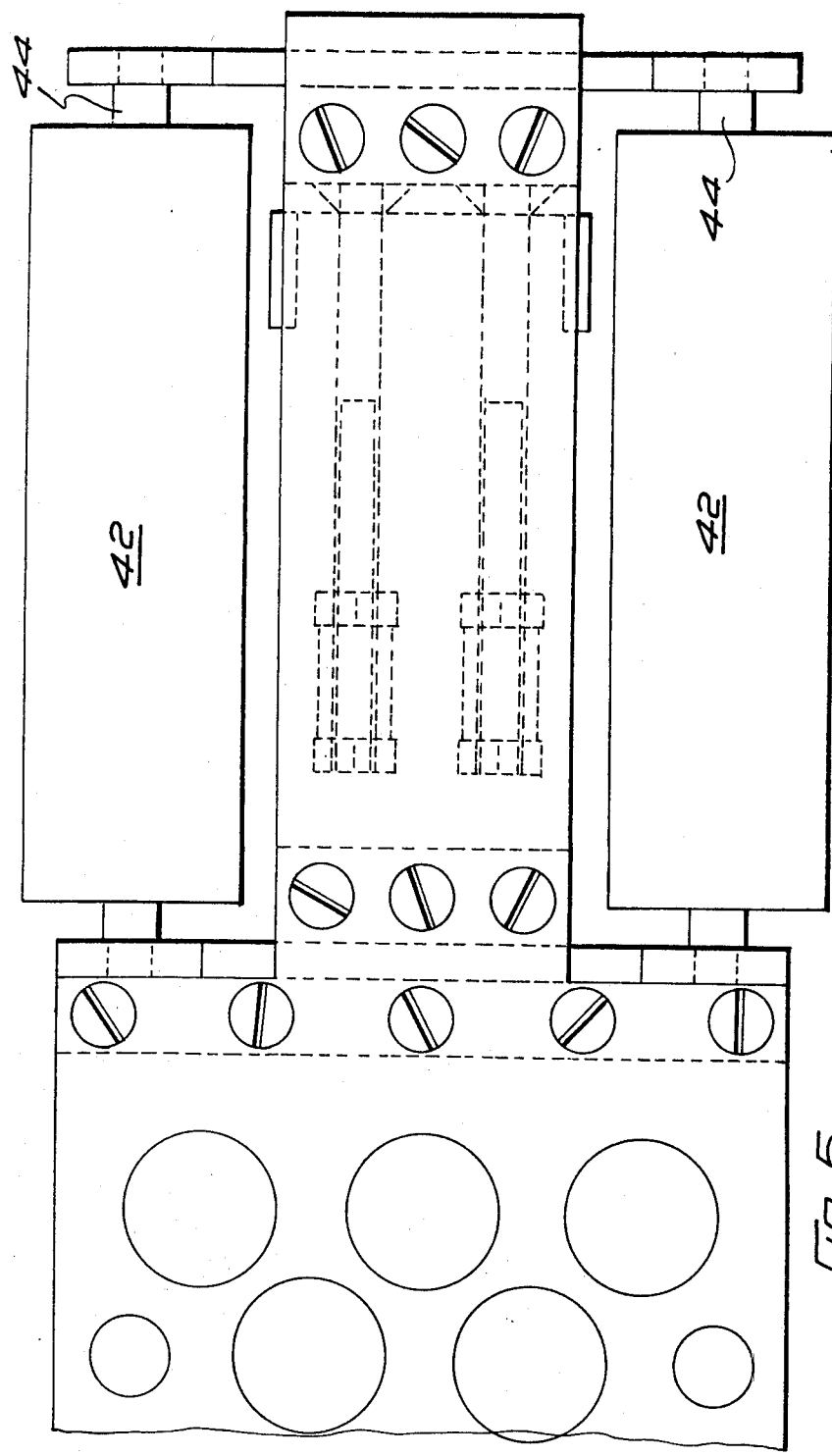
FIG. 5 is a scrap view in the direction of arrow 5 in FIG. 4.

Referring now to FIGS. 4 to 6, in a modification of the support means described above, each adjustable mounting bracket is provided with a pair of rollers 42 on which marginal edge portions of the belt are supported. Respective spindles 44 on which the rollers are freely rotatable are mounted in slots 46 in pairs of oppositely extending roller mountings 48 which project from opposite sides of the mounting brackets. The arrangement is such that when the load-carrying belt is only lightly loaded it may ride on the rollers with its central portion suspended between its marginal edge portions and clear of the troughing mat beneath it, thus saving the troughing mat and belt from undue wear. However, when more heavily loaded and when subjected to impact loading, the load-carrying belt will flex so that it slides on the troughing mat.

As in the case of the previously described embodiment, the troughing angle and the height of the troughing mat can be adjusted. In addition, with the load-carrying belt lifted clear of the rollers, the latter can very quickly and easily be removed when worn and replaced by new rollers by virtue of the simple slotted mounting of their spindles as described above. This is also an important advantage.

Thus there is provided means whereby a moving conveyor belt can be caused to trough in the region of a loading point which are simple and relatively inexpensive. The arrangement is such that deflection of the marginal edge portions of the belt can be virtually eliminated. Consequently, where the usual rubber side skirts are used at these points, it has been found that a very satisfactory degree of anti-spillage and dust free operation has been possible.

However, various further modifications may be made without departing from the scope of the invention. For example, it will be understood that the synthetic plastics troughing mat may be required to extend substantially further longitudinally of the conveyor belt than shown in the drawings. In this case, it will be understood that it may be found sufficient to simply increase the overall widths of the metal bearers and of the mounting brackets. On the other hand it may be found necessary to support the mounting brackets on pairs of spacer brackets located longitudinally of the conveyor run. It will also be understood that it may in many instances be possible to secure the spacer brackets to existing elements of the conveyor structure instead of to the special base plate 17.

We claim:

1. A moving belt conveyor mechanism comprising an endless load-carrying belt and means for supporting the belt in the region of a loading point and for causing the belt to trough, said means for supporting being constituted by a troughing mat extending completely across the conveyor and providing a trough section on which the load-carrying belt can slide to cause the belt to trough; bearers disposed on opposite sides of the conveyor mechanism, marginal portions of the troughing mat being secured to said bearers; adjustment means whereby the bearers are angularly adjustable to suit the degree of troughing required, said adjustment means being constituted by angularly adjustable mounting brackets on which the bearers are slidably mounted, screw means being provided for adjusting positions of the bearers on the mounting brackets in a direction transverse to the direction of movement of the load-carrying belt so that a height adjustment of the troughing mat can accompany an angular adjustment of the bearers.

2. A moving belt conveyor mechanism as claimed in claim 1, in which each said mounting bracket carries at least one roller on which a marginal edge portion of the load-carrying belt can be supported.

3. A moving belt conveyor mechanism as claimed in claim 2, in which the rollers are freely rotatable on respective spindles, said spindles being mounted in slots in pairs of oppositely extending roller mountings which extend from opposite sides of the mounting brackets for facilitating removal of worn rollers and their replacement by new rollers.

4. A moving belt conveyor mechanism as claimed in claim 1, in which the mounting brackets are mounted on spacer brackets spaced apart transversely of the load-carrying belt.

5. Support means for fitment to a moving belt conveyor mechanism for supporting a load-carrying belt in the region of a loading point and for causing the belt to trough, the support means being constituted by a troughing mat adapted to extend completely across the conveyor and to provide a trough section on which the load-carrying belt will slide and be caused to trough, bearers secured to marginal portions of the troughing mat and adapted to be disposed on opposite sides of the conveyor mechanism to which the support means is to be fitted, adjustment means whereby the bearers will be angularly adjustable to suit the degree of troughing required, said adjustment means including angularly adjustable mounting brackets, the bearers being slidably mounted on said mounting brackets, screw means being provided for slidably adjusting the bearers in position on said brackets so that when the support means are in use a height adjustment of the troughing mat can be effected.

6. Support means as claimed in claim 5, in which each said mounting bracket carries at least one roller on which, when the support means are in use, a marginal edge of the load-carrying belt concerned can be supported.

7. Support means as claimed in claim 6, in which the rollers are freely rotatable on respective spindles mounted in slots in pairs of oppositely extending roller mountings which extend from opposite sides of the mounting brackets, the arrangement being such that, when the support means are in use, the rollers can very quickly and easily be removed when worn and replaced by new rollers.

* * * * *